US005613886A

United States Patent [19]
Cribbs

[11] Patent Number: 5,613,886
[45] Date of Patent: Mar. 25, 1997

[54] OUTBOARD-MOTOR-MOUNTED SAFETY LIGHT APPARATUS

[76] Inventor: Arthur L. Cribbs, Rte. 5, Box 357, Perry, Fla. 32347

[21] Appl. No.: 522,558

[22] Filed: Sep. 1, 1995

[51] Int. Cl.$^6$ ..................................................... B60L 1/14
[52] U.S. Cl. .............................................. 440/2; 440/900
[58] Field of Search .......................... 362/61; 150/157; 440/49, 2, 113, 900, 87, 76, 77

[56] References Cited

U.S. PATENT DOCUMENTS

| | | |
|---|---|---|
| D. 267,202 | 12/1982 | Potts . |
| 3,870,875 | 3/1975 | Altimus ........................................ 362/61 |
| 4,620,109 | 10/1986 | Kummer . |
| 5,157,591 | 10/1992 | Chudzik . |
| 5,273,399 | 12/1993 | Ojeda . |
| 5,285,113 | 2/1994 | Schlich . |

OTHER PUBLICATIONS

Defender Calalog, Defender Industries, Inc., New Rochelle, New York, p. 130. 1994.

*Primary Examiner*—Stephen Avila

[57] ABSTRACT

An outboard-motor-mounted safety light apparatus is provided for an outboard motor and includes an electrical lamp assembly, an attachment assembly for attaching the electrical lamp assembly to an outside housing of the outboard motor, and an electrical power connection assembly for connecting the electrical lamp assembly to an electrical power source. The electrical lamp assembly includes a wire grid assembly for protecting the electrical lamp assembly from damage due to impacts upon the electrical lamp assembly. The electrical power connection assembly includes an electrical conductor assembly connected to the electrical lamp assembly. An electrical connector assembly is connected to the electrical conductor assembly for connecting the electrical conductor assembly to the electrical power source. The electrical power connection assembly includes a dual electrical connector assembly which connects both the electrical lamp assembly and the safety lights, at the rear of a boat trailer, to a common electrical power source. A light flasher assembly is electrically connected to the electrical lamp assembly, for automatically causing the electrical lamp assembly to emit a flashing light under predetermined conditions. The light flasher assembly includes an outboard-motor-speed responsive switching assembly electrically connected to the electrical lamp assembly. The outboard-motor-speed responsive switching assembly is electrically connected to a tachometer which signals outboard motor speed and sends a signal representing outboard motor speed to the outboard-motor-speed responsive switching assembly. The electrical power source battery on a boat which supports the outboard motor.

9 Claims, 3 Drawing Sheets

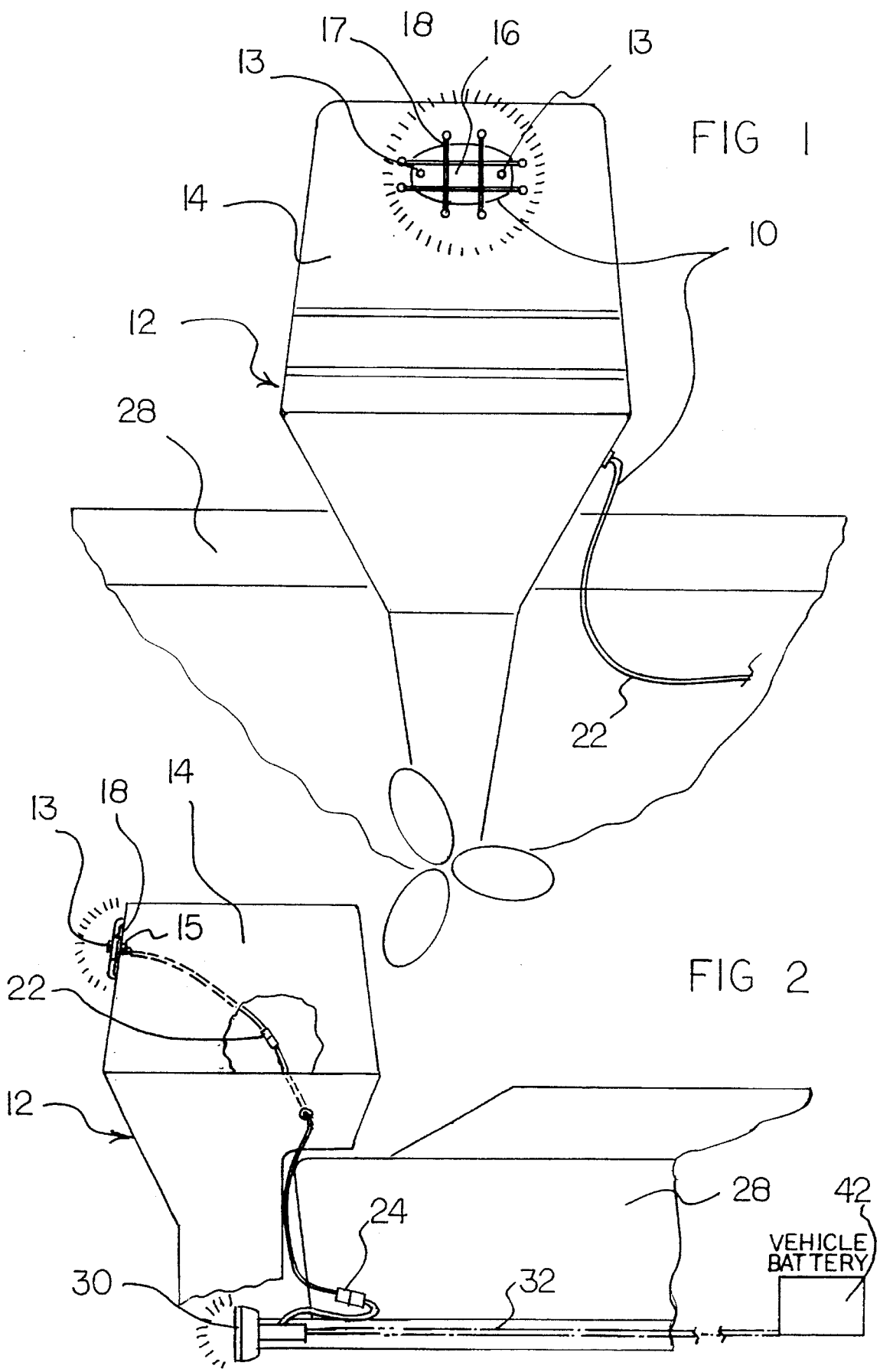

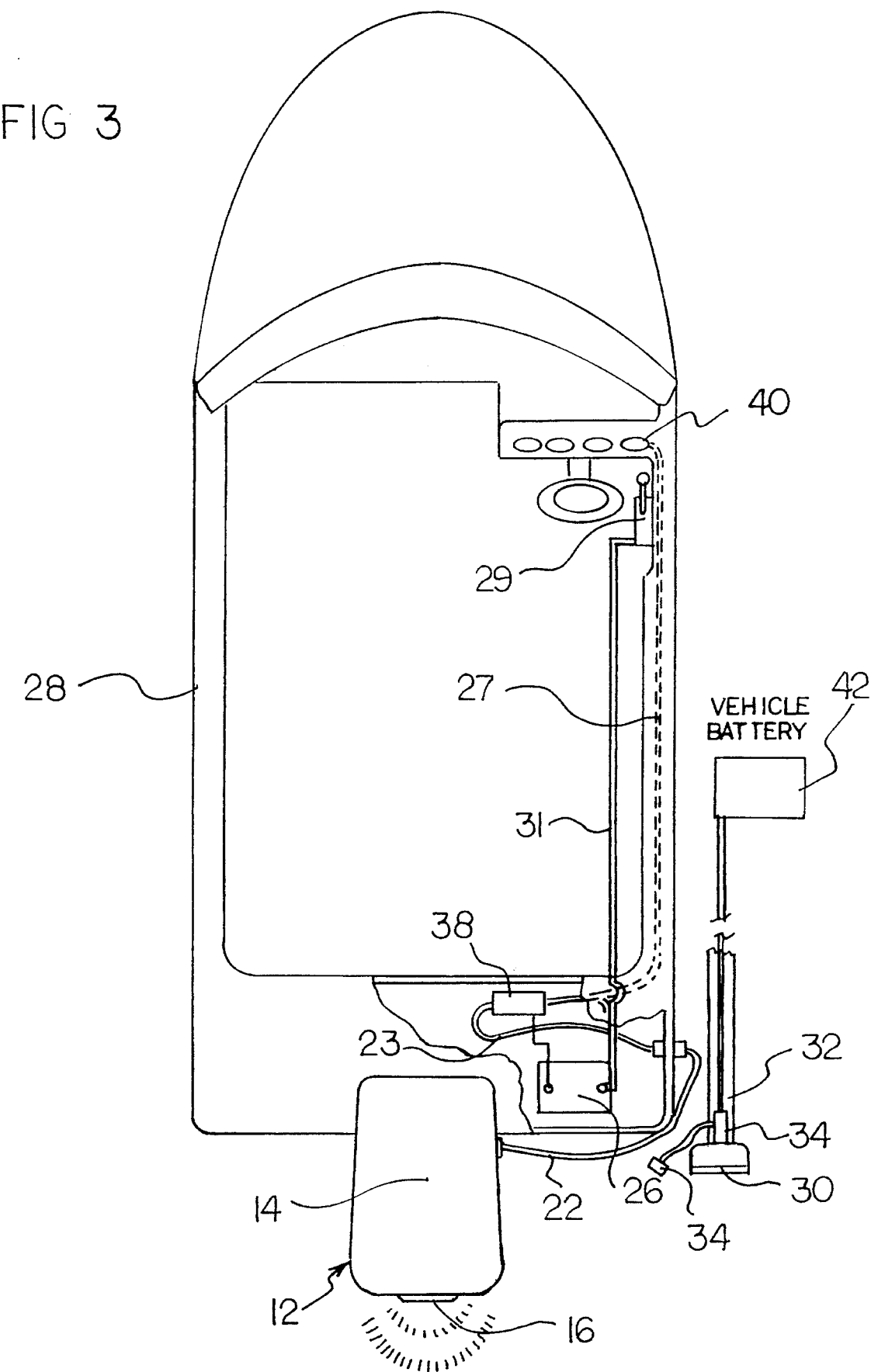

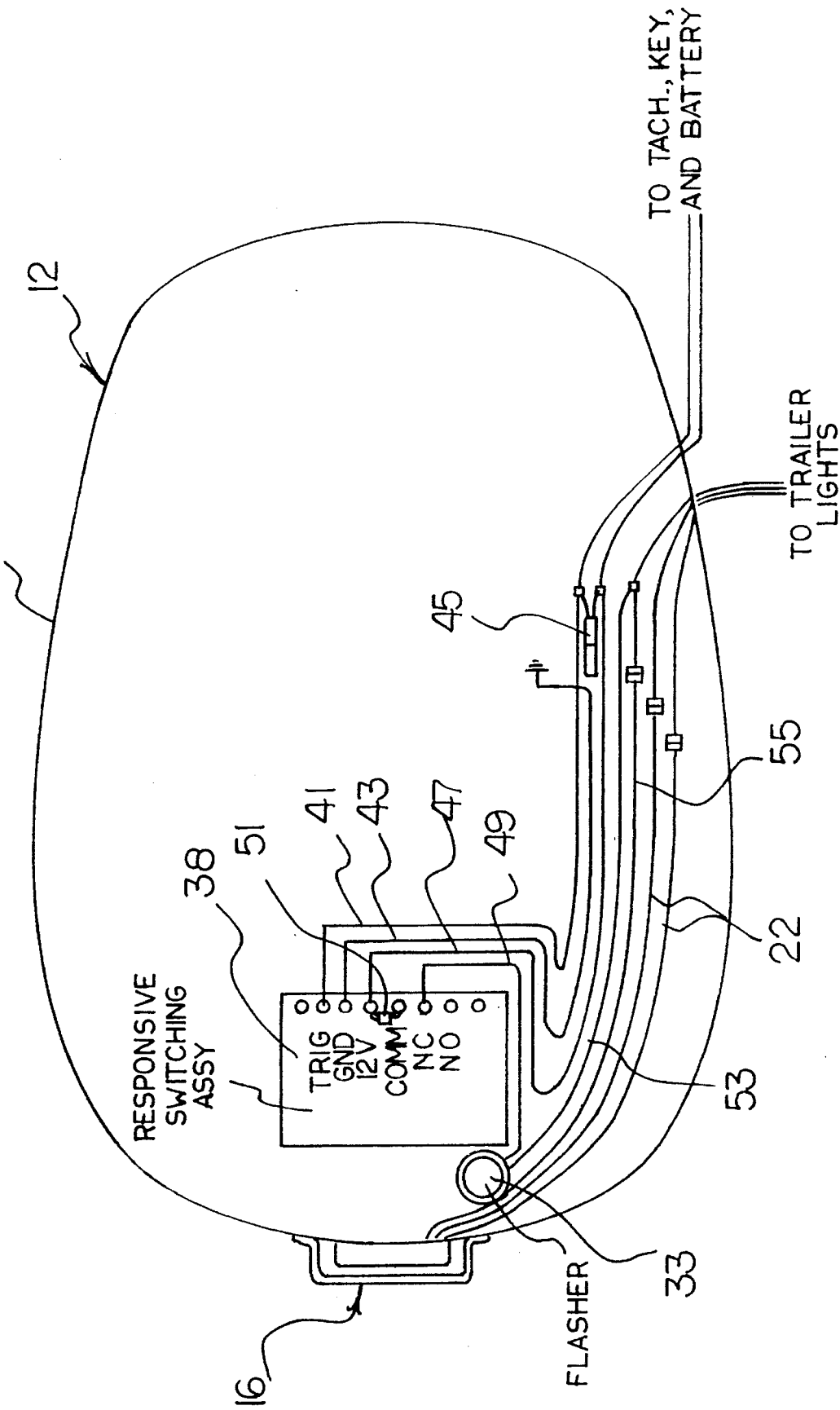

OUTBOARD-MOTOR-MOUNTED SAFETY LIGHT APPARATUS

BACKGROUND OF THE INVENTION

1. Field of the Invention

The present invention relates generally to safety lights placed on road vehicles and, more particularly, to safety lights especially adapted for an outboard motor that is towed by a trailer.

2. Description of the Prior Art

To move boats over land, wailers pulled by motor vehicles are generally employed. PAthough rear safety lights on the motor vehicles are generally placed at a relatively high level above the road surface, the safety lights that are present on the boat Wailer are generally placed at a relatively low level above the road surface. This disparity of placement of safety lights may pose a safety hazard. Drivers who are following a boat and trailer that are pulled by a vehicle are generally accustomed to seeing safety lights at a higher level than in boat trailers. As a result, the relatively low level trailer lights may not be readily noticed by a following driver. This being the case, it would be desirable if a safety light were provided for a boat and trailer that is located at a relatively high level above the road surface. A higher level safety light would be more readily noticed by a driver following the boat and trailer because the positioning of such a safety light would be at a more customary position.

Throughout the years, a number of innovations have been developed relating to safety lights for trailers, and the following U.S. patents are representative of some of those innovations: U.S. Pat. No. 4,520,109; 5,157,591; 5,285,113; and Des. 257,202. None of these patents address the issue of safety lights that are relatively low with respect to the road surface.

Another patent that may be of interest with respect to the safe towing of boats on trailers is U.S. Pat. No. 5,273,399 which discloses a cover that is placed over a propeller wherein the cover is reflective of light. Generally, a propeller is relatively low with respect to the road surface.

When a boat that has an outboard motor is towed on a trailer, the level of the outboard motor housing is generally above the level of the trailer safety lights with respect to the road surface. In this respect, it would be desirable if a safety light were provided that were supported by the housing of an outboard motor.

Still other features would be desirable in an outboard-motor-mounted safety light apparatus. The housing for an outboard motor usually includes a removable cover. Therefore, for a safety light that is supported by a removable cover of an outboard motor, it would be desirable if the safety light could be readily disconnected from its source of electrical power.

The safety lights for trailers that carry boats often derive their power from batteries that are on the boats. In this respect, for purposes of simplicity and convenience, it would be desirable if a safety light, that was supported on the removable cover of an outboard motor, derives its electrical power from the battery on the boat.

Safety considerations for an outboard motor boat extend beyond circumstances in which the boat is being towed on the road by a motor vehicle. Safety considerations also extend into the water when the boat is launched. When a boat is stopped or moving slowly in the water, drivers of other boats may not readily perceive either of those conditions. In this respect, it would be desirable if a safety light were provided on an outboard motor boat which gave warning to other boats that the subject boat is either stopped or moving slowly in the water. However, once the boat attains a certain speed, this type of safety light should turn off. Therefore, it would be desirable for a safety light that is present on a boat in the water to be controlled by a tachometer on the boat so that the safety light can be extinguished when the motor reaches a predetermined speed.

For purposes of economy and simplicity, it would be desirable if a single safety light could serve both when the boat is being towed on a trailer and when the boat was in the water in a stopped or slow speed condition. For convenience, such a single safety light could be actuated by a switch that is actuated when the engine of the outboard motor is cranked.

Thus, while the foregoing body of prior art indicates it to be well known to use safety lights on trailers that are used to tow boats, the prior art described above does not teach or suggest an outboard-motor-mounted safety light apparatus which has the following combination of desirable features: (1) provides a safety light for a boat and trailer that is located at a relatively high level above the road surface; (2) provides a safety light that is supported by the housing of an outboard motor; (3) provides a safety light can be readily disconnected from its source of electrical power; (4) derives its electrical power from a battery on the boat; (5) provides a safety light on an outboard motor boat which gives warning to other boats that the subject boat is either stopped or moving slowly in the water; (6) provides a safety light on a boat when the boat is in the water wherein the safety light is controlled by a tachometer on the boat; and (7) provides a single safety light that can serve both when the boat is being towed on a trailer and when the boat is in the water in a stopped or slow speed condition. The foregoing desired characteristics are provided by the unique outboard-motor-mounted safety light apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides an outboard-motor-mounted safety light apparatus for an outboard motor which includes an outside housing. The outboard-motor-mounted safety light apparatus includes an electrical lamp assembly, an attachment assembly for attaching the electrical lamp assembly to the outside housing of the outboard motor, and an electrical power connection assembly which is connected to the electrical lamp assembly for connecting the electrical lamp assembly to an electrical power source.

The electrical lamp assembly includes a wire grid assembly for protecting the electrical lamp assembly from damage due to impacts upon the electrical lamp assembly. The electrical power connection assembly includes an electrical conductor assembly connected to the electrical lamp assembly. An electrical connector assembly is connected to the electrical conductor assembly for connecting the electrical conductor assembly to the electrical power source.

The electrical power connection assembly includes a dual electrical connector assembly which connects both the electrical lamp assembly and the safety lights, at the rear of a boat trailer, to a common electrical power source.

A light flasher assembly is electrically connected to the electrical lamp assembly, for automatically causing the electrical lamp assembly to emit a flashing light under predetermined conditions. The light flasher assembly includes an outboard-motor-speed responsive switching assembly electrically connected to the electrical lamp assembly. The outboard-motor-speed responsive switching assembly is electrically connected to a tachometer which signals outboard motor speed and sends a signal representing outboard motor speed to the outboard-motor-speed responsive switching assembly. The electrical power source is a battery on a boat which supports the outboard motor.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least three preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved outboard-motor-mounted safety light apparatus which has all of the advantages of the prior art and none of the disadvantages.

It is another object of the present invention to provide a new and improved outboard-motor-mounted safety light apparatus which may be easily and efficiently manufactured and marketed.

It is a further object of the present invention to provide a new and improved outboard-motor-mounted safety light apparatus which is of durable and reliable construction.

An even further object of the present invention is to provide a new and improved outboard-motor-mounted safety light apparatus which is susceptible of a low cost of manufacture with regard to both materials and labor, and which accordingly is then susceptible of low prices of sale to the consuming public, thereby making such outboard-motor-mounted safety light apparatus available to the buying public.

Still yet a further object of the present invention is to provide a new and improved outboard-motor-mounted safety light apparatus which provides a safety light for a boat and trailer that is located at a relatively high level above the road surface.

Still another object of the present invention is to provide a new and improved outboard-motor-mounted safety light apparatus that provides a safety light that is supported by the housing of an outboard motor.

Yet another object of the present invention is to provide a new and improved outboard-motor-mounted safety light apparatus which provides a safety light can be readily disconnected from its source of electrical power.

Even another object of the present invention is to provide a new and improved outboard-motor-mounted safety light apparatus that derives its electrical power from a battery on the boat.

Still a further object of the present invention is to provide a new and improved outboard-motor-mounted safety light apparatus which provides a safety light on an outboard motor boat which gives warning to other boats that the subject boat is either stopped or moving slowly in the water.

Yet another object of the present invention is to provide a new and improved outboard-motor-mounted safety light apparatus that provides a safety light on a boat when the boat is in the water wherein the safety light is controlled by a tachometer on the boat.

Still another object of the present invention is to provide a new and improved outboard-motor-mounted safety light apparatus which provides a single safety light that can serve both when the boat is being towed on a trailer and when the boat is in the water in a stopped or slow speed condition.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a front view showing a safety light portion of a first embodiment of the outboard-motor-mounted safety light apparatus of the invention, wherein the safety light is in place on a removable cover of the outboard motor.

FIG. 2 is a partially cut-away side view of portions of the first embodiment of the outboard-motor-mounted safety light apparatus of the invention shown in FIG. 1.

FIG. 3 is a top view of a second embodiment of the outboard-motor-mounted safety light apparatus of the invention, wherein the invention includes an outboard-motor-speed responsive switching assembly which causes the safety light portion to flash under predetermined conditions, and wherein the outboard-motor-speed responsive switching assembly is housed in the boat.

FIG. 4 is a top view of a third embodiment of the outboard-motor-mounted safety light apparatus of the invention, wherein the invention includes an outboard-motor-speed responsive switching assembly which causes the safety light portion to flash under predetermined conditions, wherein the outboard-motor-speed responsive switching assembly is housed within the motor housing.

DESCRIPTION OF THE PREFERRED EMBODIMENT

With reference to the drawings, a new and improved outboard-motor-mounted safety light apparatus embodying the principles and concepts of the present invention will be described.

Turning to FIGS. 1 and 2, there is shown a first embodiment of the outboard-motor-mounted safety light apparatus of the invention generally designated by reference numeral 10. In its preferred form, outboard-motor-mounted safety light apparatus 10 includes an electrical lamp assembly 16, an attachment assembly 18, which may include a reflector backplate, for attaching the electrical lamp assembly 16 to a outside housing 14 of the outboard motor 12, and an electrical power connection assembly which is connected to the electrical lamp assembly 16 for connecting the electrical lamp assembly 16 to an electrical power source.

The attachment assembly 18 includes bolts 13 and nuts 15. The electrical lamp assembly 16 includes a wire grid assembly 17, attached to the outer housing of the outboard motor 12, for protecting the electrical lamp assembly 16 from damage due to impacts upon the electrical lamp assembly 16. The electrical power connection assembly includes an electrical conductor assembly 22 connected to the electrical lamp assembly 16. An electrical connector assembly 24 is connected to the electrical conductor assembly 22 for connecting the electrical conductor assembly 22 to the electrical power source.

The outside housing 14 of the outboard motor 12 can include a removable cover, and the outboard-motor-mounted safety light apparatus 10 of the invention can be mounted on the removable cover. Then, when the removable cover is removed from the outboard motor 12, the electrical connector assembly 22 can be disconnected from the electrical power source to permit the removable cover, with the electrical lamp assembly 15 of the invention attached thereto, to be set aside from the outboard motor 12.

The electrical power source that serves as the power source for illumination of the safety lights 30 that are present on the rear of a boat trailer 32 may also serve as the electrical power source for illumination the outboard-motor-mounted safety light apparatus 10 of the invention. The electrical power source for the safety lights 30 of the boat trailer 32 is generally the battery 42 of the motor vehicle which tows the trailer and the boat. In this respect, the electrical power connection assembly includes a dual electrical connector assembly 34 which connects both the electrical lamp assembly 16 and the safety lights 30, at the rear of a boat trailer 32, to a common electrical power source which is generally the battery 42 of the motor vehicle.

In employing the first embodiment of the outboard-motor-mounted safety light apparatus 10 of the invention, the electrical connector assembly 24 is connected to the dual electrical connector assembly 34 so that both the outboard-motor-mounted safety light apparatus 10 of the invention and the safety lights 30 on the boat trailer 32 receive electrical power from the battery 42 on the motor vehicle. Just before the boat 28 is removed from the boat trailer 32, the electrical connector assembly 24 is disconnected from the dual electrical connector assembly 34.

Turning to FIG. 3, a second embodiment of the invention is shown. Reference numerals are shown that correspond to like reference numerals that designate like elements shown in the other figures. In addition, light flasher assembly is electrically connected to the electrical lamp assembly 16, for automatically causing the electrical lamp assembly 16 to emit a flashing light under predetermined conditions. The light flasher assembly includes an outboard-motor-speed responsive switching assembly 38 electrically connected to the electrical lamp assembly 16. The outboard-motor-speed responsive switching assembly 38 is electrically connected to a tachometer 40 which signals outboard motor speed and sends a signal representing outboard motor speed to the outboard-motor-speed responsive switching assembly 38.

The battery 26 of the boat 28 powers the outboard-motor-speed responsive switching assembly 38 and the electrical lamp assembly 16. A second electrical conductor assembly 23 connects the outboard-motor-speed responsive switching assembly 38 with the electrical conductor assembly 22. A third electrical conductor assembly 27 connects the outboard-motor-speed responsive switching assembly 38 with the tachometer 40. The electrical power source is a battery 26 on a boat 28 which supports the outboard motor 12.

The second embodiment of the invention is used is two separate modes. In the first mode, the boat 28 is on the boat trailer 32. In this mode, the electrical connector assembly 24 of the outboard-motor-mounted safety light apparatus 10 is connected to the dual electrical connector assembly 34 so that power for the electrical lamp assembly 16 is obtained from the battery 42 of the motor vehicle which pulls the boat and trailer. After electrical connector assembly 24 is disconnected from the dual electrical connector assembly 34, the second embodiment of the invention is used in the second mode with the boat 28 in the water.

In the second mode of operation, with the boat 28 in the water, with the electrical connector assembly 24 disconnected from the dual electrical connector assembly 34, and with the electrical connector assembly 24 connected to the second electrical conductor assembly 23 which is connected to the outboard-motor-speed responsive switching assembly 38, the outboard-motor-mounted safety light apparatus 10 of the invention receives electrical power from the battery 26.

It is possible to connect the second electrical conductor assembly 23 permanently to the electrical conductor assembly 22 using a current flow device in outboard-motor-speed responsive switching assembly 38 that allows current to flow in only one direction. This would eliminate the need to plug electrical connector assembly 24 into second electrical conductor assembly 23 after it had been disconnected from dual electrical connector assembly 34. Even though the current flow device would be connected to both the trailer and the boat systems, while on the highway the current flow device would prevent an amperage increase even though both the trailer and the boat are connected.

Moreover, the outboard-motor-speed responsive switching assembly 38 operates so that when the signal from the tachometer 40 indicates that the speed of the outboard motor 12 is below a predetermined speed, e.g. 1,500 R.P.M., the outboard-motor-speed responsive switching assembly 38 is actuated, thereby causing the electrical lamp assembly 16 to emit a flashing light signal. More specifically, the outboard-motor-speed responsive switching assembly 38 can be set to activate at different R.P.M.'s depending on the horsepower of the motor. The electrical lamp assembly 16 flashes when the boat 28 is stopped or when the boat 28 is traveling at a slow speed due to relatively low motor speed.

On the other hand, when the speed of the outboard motor 12 exceeds the predetermined speed, then the outboard-motor-speed responsive switching assembly 38 is deactivated, and the electrical lamp assembly 16 ceases to flash. In such a case, the speed of the boat 28 is no longer a slow speed. When the boat 28 slows down again, the outboard-motor-speed responsive switching assembly 38 will be reactivated, and the electrical lamp assembly 16 will flash again.

The outboard-motor-speed responsive switching assembly 38 can be activated when the outboard motor 12 is turned on by a control switch 29. The electrical connection between the control switch 29 and the outboard-motor-mounted safety light apparatus 10 of the invention is shown schematically by fourth electrical conductor assembly 31 which connects the control switch 29 with the battery 26 of the boat 28. If desired, the control switch 29 can be incorporated into the ignition switch for the outboard motor 12.

Turning to FIG. 4, the third embodiment of the outboard-motor-mounted safety light apparatus 10 of the invention is shown whereby the outboard-motor-speed responsive switching assembly 38 and the light flasher assembly 33, along with appropriate wiring, are housed within the confines of the outside housing 14 of the outboard motor 12. Wires 41 and 47 run from a trigger post and a 12 volt post, respectively, on the outboard-motor-speed responsive switching assembly 38 to a circuit on the boat which includes the tachometer 40, the control switch 29, and the boat battery 26. A pod connector 45 is connected across wires 41 and 47. A wire 43 runs from a ground post on the outboard-motor-speed responsive switching assembly 38 to ground. A wire 49 runs from a NC post on the outboard-motor-speed responsive switching assembly 38 to the light flasher assembly 33. A uni-directional current flow device 51 (which may be a diode) is connected across the 12 volt post and the COMM post of the outboard-motor-speed responsive switching assembly 38. Another wire 53 runs from the light flasher assembly 33 a connector that also connects to a common wire 55 connected to the electrical lamp assembly 16. The electrical conductor assembly 22, the common wire 55, and the wire 53 from the light flasher assembly 33 are connected to the trailer safety lights 30. The light flasher assembly 33 is controlled by the outboard-motor-speed responsive switching assembly 38 when the outboard motor 12 reaches a predetermined number of revolutions per minute.

The wires that are connected to the electrical lamp assembly 16 are sufficiently long such that when the outside housing 14 is lifted off of the outboard motor 12, then the wires are long enough to remain connected to the connectors which are connected to the trailer and the boat.

From the above, it is readily seen that the outboard-motor-mounted safety light apparatus 10 of the invention can be used to enhance safety both on the road and in the water.

The outboard-motor-mounted safety light apparatus 10 of the invention is easily adapted to outboard motors up to 25 horsepower and above. Moreover, the apparatus of the invention can be adapted to any size motor with an electrical start system.

The components of the outboard-motor-mounted safety light apparatus of the invention can be made from inexpensive and durable metal and plastic materials. Conventional electronic and electrical components can be used for the outboard-motor-speed responsive switching assembly 38 and for the dual electrical connector assembly 34.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved outboard-motor-mounted safety light apparatus that is low in cost, relatively simple in design and operation, and which may advantageously be used to provide a safety light for a boat and trailer that is located at a relatively high level above the road surface. With the invention, an outboard-motor-mounted safety light apparatus provides a safety light that is supported by the housing of an outboard motor. With the invention, an outboard-motor-mounted safety light apparatus provides a safety light can be readily disconnected from its source of electrical power. With the invention, an outboard-motor-mounted safety light apparatus is provided which derives its electrical power from a battery on the boat. With the invention, an outboard-motor-mounted safety light apparatus provides a safety light on an motor boat which gives warning to other boats that the subject boat is either stopped or moving slowly in the water. With the invention, an outboard-motor-mounted safety light apparatus provides a safety light on a boat when the boat is in the water wherein the safety light is controlled by a tachometer on the boat. With the invention, an outboard-motor-mounted safety light apparatus provides a single safety light that can serve both when the boat is being towed on a trailer and when the boat is in the water in a stopped or slow speed condition.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. An outboard-motor-mounted safety light apparatus for an outboard motor which includes an outside housing, comprising:

an electrical lamp assembly, an attachment assembly for attaching said electrical lamp assembly to the outside housing of the outboard motor, and an electrical power connection assembly, connected to said electrical lamp assembly, for connecting said electrical lamp assembly to an electrical power source, further including:

a light flasher assembly, electrically connected to said electrical lamp assembly, for automatically causing said electrical lamp assembly to emit a flashing light under predetermined conditions, and an outboard-motor-speed responsive switching assembly electrically connected to said electrical lamp assembly.

2. The apparatus of claim 1 wherein said electrical lamp assembly includes a wire grid assembly for protecting said electrical lamp assembly from damage due to impacts upon said electrical lamp assembly.

3. The apparatus of claim 2 wherein said electrical power connection assembly includes:

an electrical conductor assembly connected to said electrical lamp assembly, and an electrical connector assembly, connected to said electrical conductor assembly, for connecting said electrical conductor assembly to the electrical power source.

4. The apparatus of claim 1 wherein said electrical power connection assembly includes a dual electrical connector assembly which connects both said electrical lamp assembly and safety lights that are present on the rear of a boat trailer to a common electrical power source.

5. The apparatus of claim 1 wherein said outboard-motor-speed responsive switching assembly is electrically connected to a tachometer which signals outboard motor speed and sends a signal representing outboard motor speed to said outboard-motor-speed responsive switching assembly.

6. The apparatus of claim 1 wherein the electrical power source is a battery on a boat which supports the outboard motor.

7. The apparatus of claim 1 wherein said electrical lamp assembly includes a wire grid assembly, attached to the outboard motor, for protecting said electrical lamp assembly from damage.

8. An outboard-motor-mounted safety light apparatus for an outboard motor which includes an outside housing, comprising:

an electrical lamp assembly, an attachment assembly for attaching said electrical lamp assembly to the outside housing of the outboard motor, and an electrical power connection assembly, connected to said electrical lamp assembly, for connecting said electrical lamp assembly to an electrical power source, wherein said light flasher assembly includes a dual electrical connector assembly which is adapted to selectively connect at least said electrical lamp assembly to the electrical system of a boat trailer in a first condition thereof and to said electrical power source in a second condition thereof wherein said electrical power source comprises the electrical system of said boat in said second condition.

9. The apparatus of claim 8 further including:

a light flasher assembly, electrically connected to said electrical lamp assembly, for automatically causing said electrical lamp assembly to emit a flashing light under predetermined conditions.

* * * * *